3,287,162
SILICA FILMS

Ting Li Chu and John Gavaler, Pittsburgh, Pa., assignors to Westinghouse Electric Corporation, Pittsburgh, Pa., a corporation of Pennsylvania No Drawing. Filed Jan. 27, 1964, Ser. No. 340,529
10 Claims. (Cl. 117—230)

This invention relates to semiconductor technology and in particular it concerns the formation of silicon oxide or silica films or layers on semiconductor substrates.

Silica films are used in the fabrication of semiconductor devices for three important functions: they can serve as a selective mask against the diffusion of specific impurities into a semiconductor, for the passivation of the surface of the devices, and doped silica films can serve as diffusion sources. Several techniques are available for the growth of silica films on silicon such as the thermal oxidation of silicon by oxygen and steam, anodic oxidation, deposition by chemical reactions and the like. The thermal oxidation of silicon by oxygen or steam is thermodynamically feasible both at room temperature or higher. However, the rates of these reactions at atmospheric pressure are extremely slow at temperatures below 1000° C. At higher temperatures the diffusion of impurities within the device becomes significant, resulting in their redistribution which changes device characteristics and therefore is highly undesirable. This is particularly true when thick films are required for the passivation of devices. It is thus important that the growth of silica films be carried out at lower temperatures to prevent the diffusion effects. To fulfill this requirement, the oxidation of silicon by high pressure steam, for example at 25 to 500 atmospheres, has been developed for the growth of thick silica films on silicon at moderate temperature. Under these conditions, the film growth is linear with time and directly proportional to the steam pressure. For instance, in the pressure range 50 to 400 atm., the average growth rate of the oxide film at 575° C. is 0.19 A./min.-atm.

Although germania films can be used for the fabrication of germanium devices for masking and other purposes, germania films cannot be produced on germanium by thermal oxidation because of the thermal instability of germania in the presence of germanium. However, silica films or coatings on the surface of germanium can function to mask the diffusion of impurities therein in the same fashion as indicated above with respect to silicon. Silica coatings on germanium can presently be obtained by vacuum sputtering techniques which result in a film having pin-holes and by chemical processes having a low deposition rate and which may require a temperature as high as 700° C. or higher.

It is the primary object of the present invention to provide new procedures for the development of silica films on the surfaces of semiconductor bodies.

Another object of the invention is to provide processes for the development of silica films or coatings on the surfaces of semiconductor bodies at rapid rates in comparison to what has been achieved heretofore.

A further object of the invention is to provide a thermal oxidation procedure whereby oxide films are catalytically developed on the surface of semiconductive silicon.

An additional object is to provide a new chemical decomposition or chemical transport process with which silica films and coatings are provided on the surfaces of shapes of semiconductive material, for example semiconductive silicon and germanium.

Other objects of the invention will be apparent from time to time in the following detailed description and discussion.

It has now been discovered, and it is on these discoveries that the invention is in large part predicated, that the production of silica films and coatings on the surface of semiconductive silicon substrates by steam oxidation is markedly facilitated by the presence of hydrogen fluoride. Consequently, films and coatings of silica on silicon can be rapidly produced. Furthermore they can be produced in substantial thicknesses and on shapes of semiconductive material other than silicon by a chemical transport method, for example on germanium or other semiconductive material. The chemical transport of silica is based on the reversible reaction between silica and hydrogen fluoride as represented by the equation $$SiO_2(s)+4HF(g)=SiF_4(g)+2H_2O(g)$$

Theoretical calculations indicate that this equilibrium is shifted toward the formation of silicon tetrafluoride as the temperature is decreased and it is shifted toward the formation of silica as the temperature is increased. Thus, in a closed system containing silica, hydrogen fluoride and a substrate, hydrogen fluoride is able to transport silica to the substrate if the latter is at a higher temperature.

Accordingly in one embodiment the present invention comprises subjecting a heated surface of silicon to steam and hydrogen fluoride at a superatmospheric pressure whereupon the surface of the silicon oxidizes, developing a tightly adhering film of oxide thereon. In a second embodiment, a semiconductive substrate is heated in a system containing the source silica, and hydrogen fluoride, with or without water. The semiconductor is heated at a higher temperature than the source silica. The silica, in this embodiment, is transported by the hydrogen fluoride to the surface of the semi-conductive substrate and is deposited thereon and tightly adheres thereto. The resulting silica film on the surface of the substrate can be grown to substantial thicknesses. This transport process does not consume the substrate and can be applied to any crystallographic orientation of the substrate.

It will be appreciated that in the steam oxidation of the surface of the seimconductive substrate to form a silica film, the substrate must be silicon. However, where the silica coating is transported to and deposited on a semiconductive substrate, that substrate need not necessarily be silicon. For example germanium has been successfully coated in this manner and any other semiconductive material such as semiconductive compounds, for example Group III–V, II–VI and IV—IV compounds, that are substantially inert to the hydrogen fluoride at the conditions of the process, can be similarly treated. The semiconductive substrates can be intrinsic or can contain one or more n or p type materials such as arsenic, phosphorus, boron, aluminum or the like.

In practicing this invention, the semiconductive substrate suitably is disposed in a reaction zone, such as a small tube, composed of a material that can withstand the conditions of operation, for example temperatures on the order of 300° to 800° C. or higher and pressures that can range from about 0.5 to 15 or more atmospheres. A fused quartz tube is particularly satisfactory. Typically such a tube may have dimensions of about 3 cm. I.D. and be 10 cm. in length, though other sizes or containers could as well be employed.

A wafer or other shape of the desired semiconductive material, for example semiconductive silicon, germanium or the like, is placed in the tube. The semiconductive wafer can be n or p type silicon of any resistivity. In a typical practice, a wafer of n type silicon having a resistivity of 5 to 15 ohm-cm. is used having a diameter of about 1.0 inch and a thickness of about 0.02 inch. A small amount of aqueous hydrofluoric acid of a concentration on the order of about 10 to 70 percent HF, is added to the tube. For the size tube indicated, about 0.1 to 0.3 ml. of the aqueous acid is generally adequate.

The quantity of hydrogen fluoride used is not critical to operability though it does affect the rate of oxidation or transport, and generally enough hydrogen fluoride is used to provide a partial pressure thereof of about 1 to 10 atmospheres, though other quantities can be used as well. The tube can then be cooled, as by immersion in liquid nitrogen, and then is evacuated to a high vacuum that may be on the order of $10^{-5}$ mm. Hg or lower. In this manner, good control over the atmosphere is achieved. However, it should be apparent that other techniques can be used as well. The tube is sealed and then is heated as by use of heating coils spaced about the tube or by a conventional tube furnace.

Where steam oxidation is practiced, the entire contents of the tube, i.e. the aqueous HF and the semiconductive silicon, are heated to a temperature on the order of 300° to 800° C. or more and maintained at the operating temperature for a period of about 1 to 10 hours or more. At these conditions of tube size and the like, the aqueous HF develops a pressure in the tube that may range from 0.5 up to about 15 atmospheres. The rate of oxidation can be controlled by the temperature of the substrate, the concentration and pressure of the hydrogen fluoride and the like.

As already noted, the invention also includes practice in which silica is deposited on the surfaces of a semiconductive substrate. In this embodiment, the substrate need not be restricted to silicon. The semiconductive substrate is placed in a tube along with aqueous hydrofluoric acid. A source of silica is needed for this embodiment and such can also be added to the tube. Alternatively, the tube itself may provide the silica, as for example when it is composed of quartz. In either event the tube is evacuated, sealed, and heated as before. However to cause deposition of silica conditions of operation other than those specified with respect to the steam oxidation must be used. The substrate can be heated to the same temperature, that is on the order of 300° to 800° C. but a second portion of the tube is maintained at a lower temperature, for example 100° to 500° C. less than that of the substrate. A typical temperature used in the second lower temperature zone within the tube can be 100° to 300° C. These conditions of temperature can easily be attained by use of separate heating coils along the length of the tube or using a tube furnace having different, separately controllable temperature zones. These conditions can be maintained from one to 200 hours or more. It should be noted, however, that when silicon is the substrate material, the pressure developed within the reaction tube and the hydrogen fluoride concentration must be less than that used during steam oxidation, other conditions being equal, if oxidation of the substrate is to be minimized or avoided. The deposition rate of the silica film on the substrate depends on the substrate temperature, the temperature gradient in the system, and the composition and concentration of the transport agent, and the rate of transport can be controlled by adjusting those process variables as desired.

The invention will be described further with respect to the following specific examples in which the details are given by way of illustration and not by way of limitation.

*Example I*

A wafer of n-type silicon having a resistivity of about 10 ohm-cm., and being 1 inch in diameter and about 0.02 inch thick is placed in a fused quartz tube having an inside diameter of 3 cm. and which is 10 cm. long. About 0.17 ml. of 49 percent aqueous hydrofluoric acid is added to the tube, which is then cooled by partial immersion in liquid nitrogen. The tube is evacuated to a pressure below $10^{-5}$ mm. Hg and then is sealed while under vacuum. This tube is placed in a horizontal tube furnace maintained at a temperature of 550° C. At these conditions, a pressure of 7.5 atmospheres develops in the tube.

In one test as described, the tube was removed after 2½ hours and the silicon substrate was examined. It was found that a layer of silica 41 microns in thickness had formed. This is an average growth rate of 360 angstroms per min-atm. By way of comparison, this rate of growth is about 2000 times higher than that reported heretofore for steam oxidation where no hydrogen fluoride was used.

*Example II*

A wafer of germanium 1 inch in diameter and about 0.02 inch thick is placed in a fused quartz tube having an inside diameter of 3 cm. and which was 10 cm. long. About 0.17 ml. of 49 percent aqueous hydrofluoric acid is added to the tube, which is then cooled by partial immersion in liquid nitrogen. The tube is evacuated to a pressure below $10^{-5}$ mm. Hg and then sealed while under vacuum. This tube is placed in a horizontal tube furnace having a hot zone adjacent the germanium wafer at a temperature of 550° C. The other end of the reaction tube is maintained at about 150° C. At these conditions, it is found that silica is deposited at a rate of about one micron per hour.

Silica layers as just described have been produced to thicknesses of 100 and 120 microns and examined. It has been found that the deposited layer tightly adheres to the germanium, being held by chemical bonds. Moreover, they are transparent, even at substantial thickness, having the very high density of 2.23 grams per cc. which indicates a very good material. Compared to other techniques of obtaining silica films on germanium, this process, which appears to involve formation of silicon tetrafluoride and its hydrolysis at the surface whereupon silica deposits, is simpler and more economical in operation.

*Example III*

Semiconductive silicon is coated with deposited silica in the same manner as just indicated in Example II with respect to germanium. In one run the substrate within the tube was maintained at a temperature of 520° C. while the other end thereof was held at about 150° C. In 16 hours, 2.5 microns of silica were deposited. In other runs generally similar, 10 micron thick films were deposited over a period of 70 hours. It was found that the thickness of deposited silica film was approximately a linear function of time and the silicon surface showed no sign of oxidation.

The resulting silica films are tightly adherent to the silica substrate. Study of these show that the films were deposited rather than grown as a result of steam oxidation for the substrate thickness at the end of each run was the same as the initial thickness.

Silica films doped with n and p type impurities such as boron, gallium, phosphorus, arsenic, antimony etc. have been deposited on silicon substrates in accordance with the invention. These doped films function as the diffusion source of the respective impurities, which can be diffused into the silicon substrate by heating at about 1100° to 1300° C. for one-half to 50 hours or more. After diffusion, surface concentrations of these impurities of $10^{19}$ atoms per cc. or higher have been obtained.

Silica films transported onto silicon substrates have been shown to be able to mask the diffusion of phosphorus and boron into silicon. For example, an 0.5 micron thick layer can mask the diffusion of phosphorus at 1140° C. for surface concentrations of phosphorus up to $10^{21}$ atoms per cc.

In each of Examples II and III, the silica for the process was provided by the quartz tube itself. It should be understood that a separate source of silica can be included if desired for any reason.

From the foregoing discussion and description, it is evident that the present invention provides unique ways by which silica films can be provided on the surfaces of semiconductive substrates. In view of the low temperature used relative to other processes, compared on the basis of results achieved in a given time, it is evident that the process is uniquely superior to those known heretofore. For example, less plastic deformation of the substrates occurs and diffusion effects occurring as a result of the extended time at elevated temperature are negligible. The films produced can serve, for example, as masks against the diffusion of impurities into the semiconductive substrates, can serve as surface passivation, and can serve as diffusion sources. For this latter purpose, it is possible to include dopants such as metals or metal salts, by including such materials in the system during the deposition or growth of the layer of silica.

While the invention has been described with respect to specific materials and conditions it will be evident that changes can be made without departing from its scope.

We claim:

1. The method comprising placing a wafer of semiconductive silicon and aqueous hydrofluoric acid in a reaction zone, said aqueous hydrofluoric acid having a concentration of hydrogen fluoride of from about 10 to 70 percent and heating the acid to a temperature of about 300° C. to 800° C. to develop a steam pressure therein whereby an oxide film is grown on the wafer of semiconductive silicon.

2. The method comprising heating at a first temperature a body of material in the presence of hydrogen fluoride, said body being inert to hydrogen fluoride during said heating, and heating a silica source at a second temperature that is below said first temperature, whereby silica is deposited on said body by transport from the silica source.

3. The method of claim 2 in which the hydrogen fluoride is present as hydrofluoric acid.

4. The method of claim 2 wherein said first temperature is in the range from about 300° C. to 800° C. and said second temperature is in the range of about 100° C. to 300° C.

5. The method comprising placing a semiconductive wafer of a material selected from the group consisting of germanium and silicon in a first portion of an evacuated reaction zone, introducing silica, hydrogen fluoride and water into a second portion of the reaction zone, then heating the second portion of the reaction zone at a first temperature while heating the first portion at a higher temperature to develop a silica coating on the semiconductive wafer.

6. The method of providing a silica film on the surface of a semiconductive substrate comprising enclosing a semiconductive substrate in a reaction zone including a source of silica, introducing hydrogen fluoride into the reaction zone, heating a portion of the reaction zone including the substrate to a temperature within the range of about 300° to 800° C., heating a second portion of the reaction zone including the hydrogen fluoride and source of silica to a lower temperature in the range of about 100° to 300° C. and recovering the resulting silica coated semiconductive substrate.

7. A method according to claim 6 in which the semiconductive substrate is a member selected from the group consisting of germanium and silicon.

8. A method in accordance with claim 7 wherein said source of silica is in a wall of said reaction zone and said hydrogen fluoride is present as hydrofluoric acid in an amount sufficient, at the temperatures of operation, to produce a super-atmospheric pressure of up to 15 atmospheres on said wall of said reaction zone.

9. A method in accordance with claim 8 wherein the hydrogen fluoric acid is aqueous hydrofluoric acid having a concentration of 10 to 70 percent hydrogen fluoride.

10. The method comprising heating at a first temperature a wafer of a semiconductive material in the presence of hydrogen fluoride, heating a conductivity determining impurity and a silica source at a second temperature that is below said first temperature, whereby silica containing a conductivity determining impurity is deposited on the wafer, then heating the resulting wafer to diffuse the impurity from the silica into the semiconductive wafer.

References Cited by the Examiner

UNITED STATES PATENTS 2,930,722 3/1960 Ligenza ------------ 148—1.5

ALFRED L. LEAVITT, *Primary Examiner.*

RICHARD D. NEVIUS, W. L. JARVIS, *Assistant Examiners.*